US009581509B2

United States Patent
Huang

(10) Patent No.: US 9,581,509 B2
(45) Date of Patent: Feb. 28, 2017

(54) DIAPHRAGM PRESSURE GAUGE

(71) Applicant: ZHONGSHAN FUMAO SEALS-TECH CO., LTD., Zhongshan, Guangdong (CN)

(72) Inventor: Chang-Ching Huang, Chiayi (TW)

(73) Assignee: Zhongshan Fumao Seals-Tech Co., Ltd., Zhongshan, Guangdong (CN)

( * ) Notice: Subject to any disclaimer, the term of this patent is extended or adjusted under 35 U.S.C. 154(b) by 228 days.

(21) Appl. No.: 14/543,188

(22) Filed: Nov. 17, 2014

(65) Prior Publication Data

US 2015/0185097 A1 Jul. 2, 2015

(30) Foreign Application Priority Data

Dec. 30, 2013 (CN) .......................... 2013 1 0755283

(51) Int. Cl.
*G01L 7/08* (2006.01)
*G01L 7/16* (2006.01)

(52) U.S. Cl.
CPC ...................................... *G01L 7/08* (2013.01)

(58) Field of Classification Search
CPC ................ G01L 7/08; G01L 7/16; G01L 7/00
See application file for complete search history.

(56) References Cited

U.S. PATENT DOCUMENTS 1,412,698 A * 4/1922 Malivert .................. G01L 7/00 116/271
2,054,911 A * 9/1936 Newell ..................... G01L 7/00 73/729.1
2,728,231 A * 12/1955 Blair ......................... G01L 7/00 137/85
2,883,995 A * 4/1959 Astley ....................... G01L 7/00 137/82
3,110,284 A * 11/1963 Napier ................. A62C 13/003 116/284
3,760,638 A * 9/1973 Lawson .................... G01L 7/00 73/706
3,880,010 A * 4/1975 Pietsch ..................... G01L 7/08 73/715

(Continued)

FOREIGN PATENT DOCUMENTS

DE 2556285 A1 * 6/1977 ............. G01L 7/084

*Primary Examiner* — Nguyen Ha
(74) *Attorney, Agent, or Firm* — Rankin, Hill & Clark LLP

(57) ABSTRACT

A diaphragm pressure gauge includes a base, an inner cover, a diaphragm, a movement assembly, a pointer assembly, a dial plate, and an outer cover. The movement assembly is disposed within the inner cover. The diaphragm is disposed at a bottom end of the inner cover. The pointer assembly is disposed above the inner cover and connected with the movement assembly. A pressing worm shaft connected to the movement assembly is disposed at a central portion of the diaphragm. The base includes a connecting portion defining therein a pressure chamber in which a piston is disposed. The base defines a piston hole for engaging with the piston. One end of the piston extends through the piston hole and presses against the pressing worm shaft. The diaphragm pressure gauge can effectively prevent corrosion and damage of components inside the pressure gauge and detect a pressure as high as 1000 kg/cm$^2$.

4 Claims, 2 Drawing Sheets

12 10 24 17 16 9 23 8 6 5 1 2 3 21 7 22 18

(56) References Cited

U.S. PATENT DOCUMENTS

| | | | | |
|---|---|---|---|---|
| 4,343,188 | A * | 8/1982 | Baker | G01L 7/18 73/706 |
| 7,784,353 | B1 * | 8/2010 | Feldmeier | G01L 19/0023 73/744 |
| 2013/0014588 | A1 * | 1/2013 | Feldmeier | G01L 19/0023 73/756 |
| 2013/0098161 | A1 * | 4/2013 | Lee | G01L 7/163 73/744 |
| 2014/0299044 | A1 * | 10/2014 | Wang | G01L 7/084 116/271 |

* cited by examiner

DIAPHRAGM PRESSURE GAUGE

FIELD

The present invention relates to a diaphragm pressure gauge.

BACKGROUND

A diaphragm pressure gauge generally consists of four parts including a diaphragm part, a movement part, a pointer part as well as an outer cover connection part. The diaphragm pressure gauge uses a diaphragm as the elastic element of the instrument. When the pressure of a medium to be detected acts on the diaphragm, the diaphragm generates a displacement. This displacement is transmitted to the movement part which in turn drives the pointer part to operate, such that the detected pressure is clearly indicated on a dial plate. However, current diaphragm pressure gauges have the following problems. First, the diaphragm is usually made of spring steel (SK5) in order to satisfy the elasticity requirement. The diaphragm made of spring steel gets rusted and corroded easily because of a direct-contact between the structure of the diaphragm and the detection medium (e.g. water or polluted water). Second, there is a large pressure contact area, which requires a large amount of material, a large thickness and strength. These requirements translate into a high cost. Finally, because of the large pressure contact area, this construction is usually suitable only for detecting a low pressure below about 10 kg/cm$^2$ but not suitable for detecting a high pressure such as 1000 kg/cm$^2$.

SUMMARY

According, a diaphragm pressure gauge is provided which is corrosion-resistant and capable of detecting a high pressure.

A diaphragm pressure gauge is provided which includes a base, an inner cover, a diaphragm, a movement assembly, a pointer assembly, a dial plate, and an outer cover. The movement assembly is disposed within the inner cover. The diaphragm is disposed at a bottom end of the inner cover. The pointer assembly is disposed above the inner cover and is connected with the movement assembly. A pressing worm shaft connected to the movement assembly is disposed at a central portion of the diaphragm. The base includes a connecting portion at a bottom end thereof. The connecting portion defines therein a pressure chamber in which a piston is disposed. The base defines a piston hole therein for engaging with the piston. One end of the piston extends through the piston hole and presses against the pressing worm shaft.

In one embodiment, a screw and an oil seal are disposed in the pressure chamber, the screw is tightly threaded into the pressure chamber via a thread connection and presses against the oil seal, the screw and the oil seal each defines a through hole for engaging with the piston, the piston hole is fluidly sealed and insulated from the pressure chamber by means of the screw and the oil seal.

In one embodiment, the inner cover and the diaphragm are mounted to the base by screws, and a chamber for receiving the movement assembly is formed between the inner cover and the diaphragm.

In one embodiment, the movement assembly includes a shaft sleeve connected with the pressing worm shaft, and a rotary shaft connected to the shaft sleeve via a thread connection, a spring matching elasticity of the diaphragm is attached around the rotary shaft and the shaft sleeve, the spring presses against an upper end of the rotary shaft and a lower end of the shaft sleeve, respectively, a guide shaft is disposed on the rotary shaft for providing a torque to the rotary shaft.

In one embodiment, the pointer assembly includes a pointer pressing plate fixed to the inner cover and a pointer, the upper end of the rotary shaft extends sequentially through the inner cover and the pointer and presses against the pointer pressing plate, the pointer is fixed to the rotary shaft.

In one embodiment, a bottom end of the connecting portion is bent such that the connecting portion is parallel to the dial plate.

In view of the foregoing, the diaphragm pressure gauge includes a base, an inner cover, a diaphragm, a movement assembly, a pointer assembly, a dial plate, and an outer cover. The movement assembly is disposed within the inner cover. The diaphragm is disposed at a bottom end of the inner cover. The pointer assembly is disposed above the inner cover and is connected with the movement assembly. A pressing worm shaft connected to the movement assembly is disposed at a central portion of the diaphragm. The base includes a connecting portion at a bottom end thereof. The connecting portion defines therein a pressure chamber in which a piston is disposed. The base defines a piston hole therein for engaging with the piston. One end of the piston extends through the piston hole and presses against the pressing worm shaft. The principle of this diaphragm pressure gauge is as follows: the pressure gauge is connected via its connecting portion to a tube of medium to be detected. The pressure of the detection medium presses the piston to slide upwardly. The upper end of the piston presses against the pressing worm shaft. As such, the rotary shaft is rotated with respect to the shaft sleeve to drive the pointer to rotate. As a result, pressure values can be displayed on the dial plate, thus obtaining the pressure of the medium. The medium pressure is transmitted in a non-contact manner, such that the detection medium will not flow into the pressure gauge, which can effectively prevent corrosion and damage of components inside the pressure gauge. In addition, the pressure gauge does not need to bear pressure because no detection medium exists in the pressure gauge and can thus be manufactured with a thinner profile and without a sealing gasket. This reduces cost. Furthermore, the pressure gauge is capable of detecting a pressure as high as 1000 kg/cm$^2$ because of a small pressure bearing area in this invention.

DESCRIPTION OF THE EMBODIMENTS

In order to make the objectives, technical solutions and advantages become more apparent, more detailed description of the present invention is made below with reference to the drawings and embodiments. It is to be understood that the specific embodiments explained herein are intended for the purpose of description only and shall not be used to limit the present invention.

Figure 1:
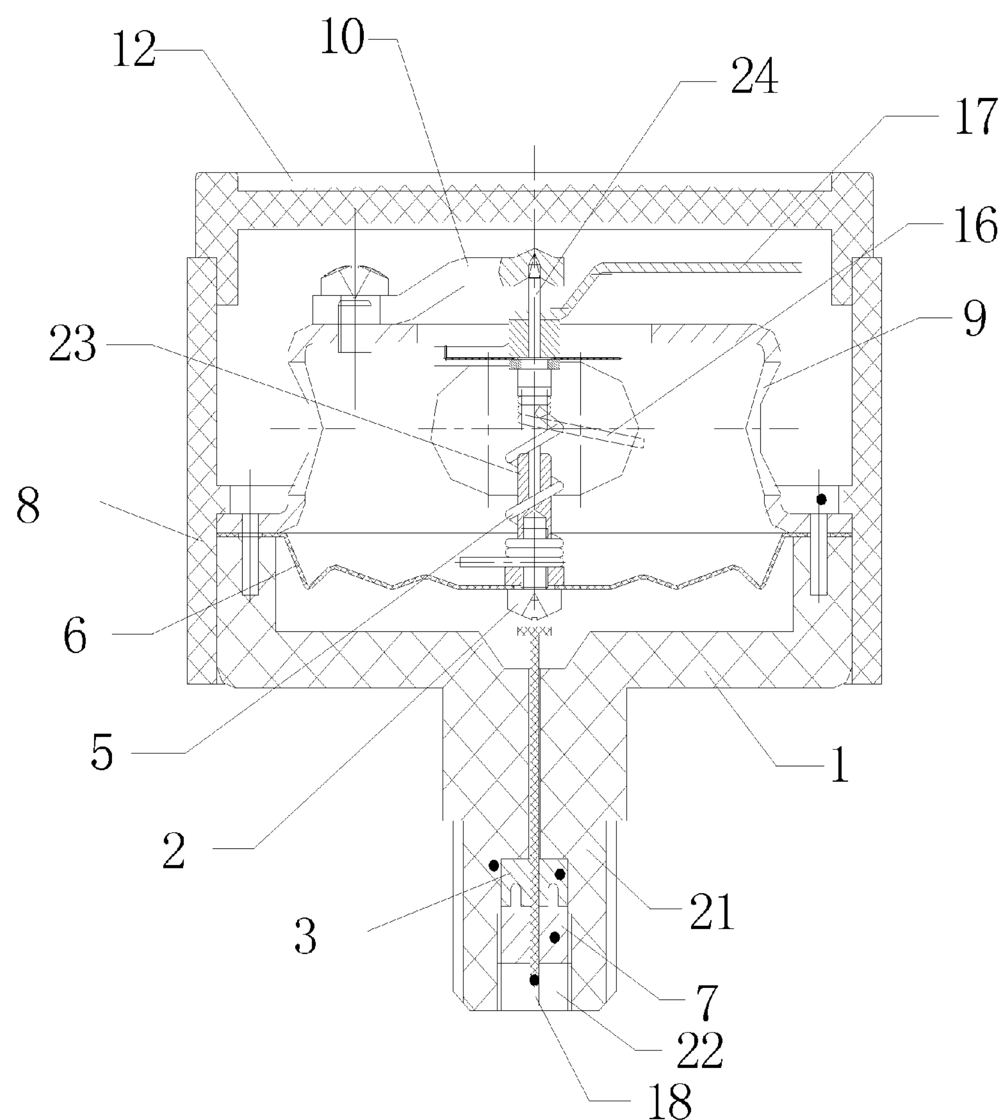
FIG. 1 is a sectional view of a diaphragm according to a first embodiment.

FIG. 1 illustrates a diaphragm pressure gauge according to a first embodiment. As shown, the diaphragm pressure gauge includes a base 1, an inner cover 9, a diaphragm 6, a movement assembly, a pointer assembly, a dial plate 12, and an outer cover 8. The movement assembly is disposed within the inner cover 9. The diaphragm 6 is disposed at a bottom end of the inner cover 9. The pointer assembly is disposed above the inner cover 9 and is connected with the movement assembly. A pressing worm shaft 2 is disposed at a central portion of the diaphragm 6, which is connected to the movement assembly. The base 1 includes a connecting portion 21 at a bottom end thereof. The connecting portion 21 defines a pressure chamber 22 in which a piston 18 is disposed. The base 1 defines a piston hole therein for engaging with the piston 18. One end of the piston 18 extends through the piston hole and presses against the pressing worm shaft 2.

A screw 7 and an oil seal 3 are disposed in the pressure chamber 22. The screw 7 is tightly threaded into the pressure chamber 22 through a thread connection and presses against the oil seal 3. The screw 7 and the oil seal 3 each defines a through hole for engaging with the piston 18. By means of the screw 7 and the oil seal 3, the piston hole is fluidly sealed and insulated from the pressure chamber 22, which prevents flow of detection medium into the pressure gauge.

The inner cover 9 and diaphragm 6 are mounted to the base 1 by screws. A chamber is formed between the inner cover 9 and the diaphragm 6, for receiving the movement assembly. The movement assembly includes a shaft sleeve 23 connected with the pressing worm shaft 2, and a rotary shaft 24 connected to the shaft sleeve 23 via a thread connection. A spring 5 matching elasticity of the diaphragm is attached around the rotary shaft 24 and shaft sleeve 23. The spring 5 presses against an upper end of the rotary shaft 24 and a lower end of the shaft sleeve 23, respectively. A guide shaft 16 is disposed on the rotary shaft 24, which can provide a torque to the rotary shaft. The pointer assembly includes a pointer pressing plate 10 fixed to the inner cover 9 and a pointer 17. The upper end of the rotary shaft 24 extends sequentially through the inner cover 9 and the pointer 17 and presses against the pointer pressing plate 10. The pointer 17 is fixed to the rotary shaft 24.

The principle of this invention is as follows: the pressure gauge is connected via its connecting portion 21 to a tube of medium to be detected. The pressure of the detection medium presses the piston to slide upwardly. The upper end of the piston presses against the pressing worm shaft. As such, the rotary shaft 24 is rotated with respect to the shaft sleeve 23 to drive the pointer 17 to rotate. As a result, pressure values can be displayed on the dial plate 12, thus obtaining the pressure of the medium. The medium pressure is transmitted in a non-contact manner, such that the detection medium will not flow into the pressure gauge, which can effectively prevent corrosion and damage of components inside the pressure gauge. In addition, the pressure gauge does not need to bear pressure because no detection medium exists in the pressure gauge and can thus be manufactured with a thinner profile and without a sealing gasket. This reduces cost. Furthermore, the pressure gauge is capable of detecting a pressure as high as 1000 kg/cm$^2$ because of a small pressure bearing area in this invention.

In this embodiment, the present invention is implemented as a pressure gauge for detecting the pressure of a medium. When the medium is a temperature dependent medium such as mercury or alcohol, the scale values on the pressure gauge also reflect the temperature change of the mercury or alcohol while they are the pressure values of the mercury or alcohol. Therefore, by replacing the scale values of the dial plate 12, the pressure gauge of the present invention can also be used as a thermometer which operates in the same principle as described above, a detailed explanation thereof is therefore omitted herein.

Figure 2:
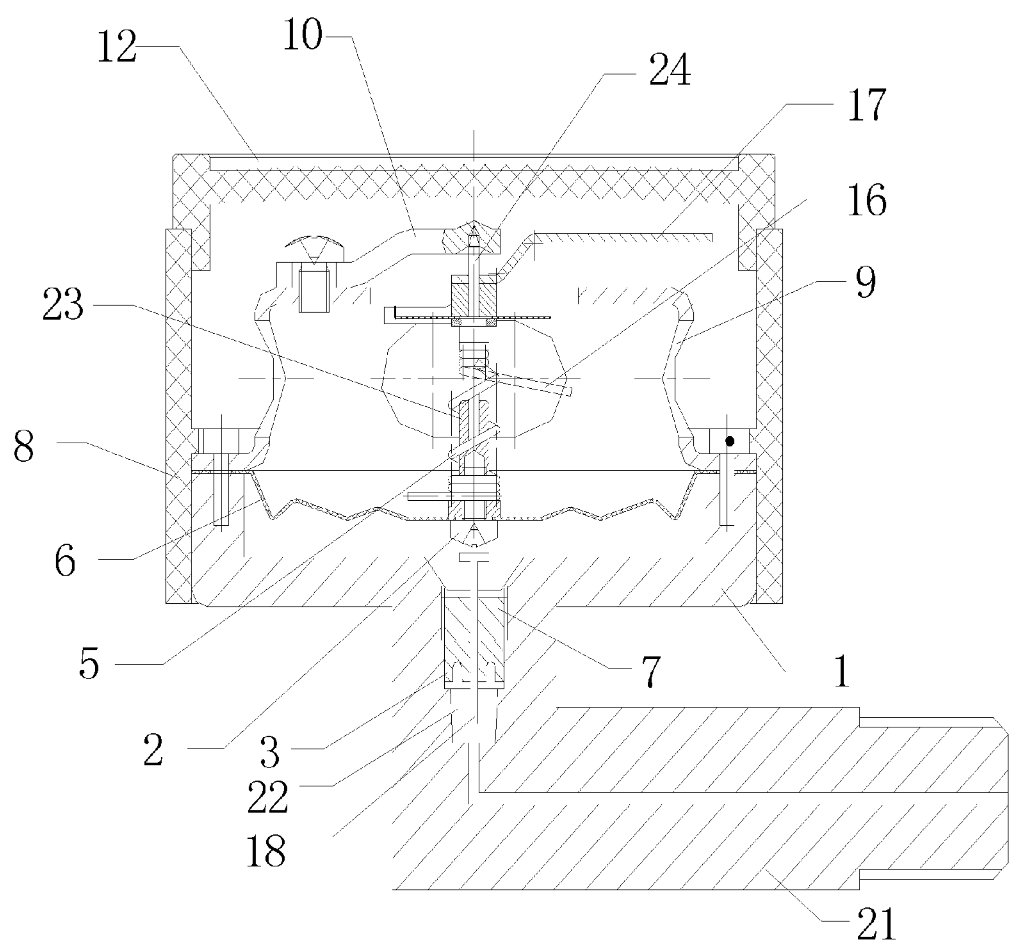
FIG. 2 is a second view of a diaphragm according to a second embodiment.

FIG. 2 illustrates a second embodiment of this invention. In this embodiment, the bottom end of the connecting portion 21 is bent such that the connecting portion 21 is parallel to the dial plate 12. As such, the pressure gauge can be vertically mounted and therefore its mounting and use are more flexible.

It will be apparent to those skilled in the art that various modifications and variations can be made to the disclosed structure without departing from the scope or spirit of the invention. In view of the foregoing, it is intended that the present invention cover modifications and variations of this invention provided they fall within the scope of the following claims and their equivalents.

What is claimed is:

1. A diaphragm pressure gauge comprising a base, an inner cover, a diaphragm, a movement assembly, a pointer assembly, a dial plate, and an outer cover, wherein the movement assembly is disposed within the inner cover, the diaphragm is disposed at a bottom end of the inner cover, the pointer assembly is disposed above the inner cover and is connected with the movement assembly, a pressing worm shaft connected to the movement assembly is disposed at a central portion of the diaphragm, the base comprises a connecting portion at a bottom end thereof, the connecting portion defines therein a pressure chamber in which a piston is disposed, the base defines a piston hole therein for engaging with the piston, one end of the piston extends through the piston hole and presses against the pressing worm shaft, the inner cover and the diaphragm are mounted to the base by screws, and a chamber for receiving the movement assembly is formed between the inner cover and the diaphragm, the movement assembly comprises a shaft sleeve connected with the pressing worm shaft, and a rotary shaft connected to the shaft sleeve via a thread connection, a spring matching elasticity of the diaphragm is attached around the rotary shaft and the shaft sleeve, the spring presses against an upper end of the rotary shaft and a lower end of the shaft sleeve, respectively, a guide shaft is disposed on the rotary shaft for providing a torque to the rotary shaft.

2. The diaphragm pressure gauge of claim 1, wherein a screw and an oil seal are disposed in the pressure chamber, the screw is tightly threaded into the pressure chamber via a thread connection and presses against the oil seal, the screw and the oil seal each defines a through hole for engaging with the piston, the piston hole is fluidly sealed and insulated from the pressure chamber by means of the screw and the oil seal.

3. The diaphragm pressure gauge of claim 1, wherein the pointer assembly comprises a pointer pressing plate fixed to the inner cover and a pointer, the upper end of the rotary shaft extends sequentially through the inner cover and the pointer and presses against the pointer pressing plate, the pointer is fixed to the rotary shaft.

4. The diaphragm pressure gauge of claim 1, wherein a bottom end of the connecting portion is bent such that the connecting portion is parallel to the dial plate.

* * * * *